US009474265B2

(12) United States Patent
Duncan et al.

(10) Patent No.: US 9,474,265 B2
(45) Date of Patent: Oct. 25, 2016

(54) METHODS AND SYSTEMS FOR DIRECTING BIRDS AWAY FROM EQUIPMENT

(71) Applicant: Elwha LLC, Bellevue, WA (US)

(72) Inventors: William D. Duncan, Kirkland, WA (US); Roderick A. Hyde, Redmond, WA (US); Muriel Y. Ishikawa, Livermore, CA (US); Jordin T. Kare, Seattle, WA (US); Thomas A. Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 286 days.

(21) Appl. No.: 13/686,707

(22) Filed: Nov. 27, 2012

(65) Prior Publication Data

US 2014/0148978 A1    May 29, 2014

(51) Int. Cl.
*G01C 23/00* (2006.01)
*B64B 1/06* (2006.01)
*A01M 29/10* (2011.01)
*A01M 29/12* (2011.01)
*A01M 29/16* (2011.01)
*A01M 31/00* (2006.01)

(52) U.S. Cl.
CPC ............. *A01M 29/10* (2013.01); *A01M 29/12* (2013.01); *A01M 29/16* (2013.01); *A01M 31/002* (2013.01)

(58) Field of Classification Search
USPC ................................................. 701/3; 244/30
See application file for complete search history.

(56) References Cited

U.S. PATENT DOCUMENTS

| 4,823,908 | A |   | 4/1989  | Tanaka et al. |
|-----------|---|---|---------|---------------|
| 5,270,707 | A | * | 12/1993 | Schulte ................ B64D 47/06 244/1 R |
| 5,774,088 | A |   | 6/1998  | Kreithen |
| 5,884,426 | A |   | 3/1999  | Ishida |
| 6,250,255 | B1 |  | 6/2001  | Lenhardt et al. |
| 6,328,986 | B1 | * | 12/2001 | Ballinger, Jr. ........... A01C 1/06 424/405 |
| 6,407,670 | B1 |  | 6/2002  | Dysarsz et al. |
| 6,445,409 | B1 |  | 9/2002  | Ito et al. |
| 6,584,205 | B1 |  | 6/2003  | Croft et al. |
| 6,623,243 | B1 |  | 9/2003  | Hodos |

(Continued)

FOREIGN PATENT DOCUMENTS

| GB | 2176073 A | * | 12/1986 | ............ G01S 13/86 |
|----|-----------|---|---------|------------------------|
| TW | 201336410 | * | 3/2012 | |

(Continued)

OTHER PUBLICATIONS

Harris et al.; "Evaluation of the Efficacy of Products and Techniques for Airport Bird Control"; Aerodrome Safety Branch, Transport Canada—LGL Report TA2193; Mar. 31, 1998; 209 pages; Her Majesty the Queen in Right of Canada, represented by the Minister of Transport.

(Continued)

*Primary Examiner* — Thomas G Black
*Assistant Examiner* — Tyler Paige
(74) *Attorney, Agent, or Firm* — Foley & Lardner LLP

(57) ABSTRACT

A system for directing a bird away from equipment includes an item of equipment and a detector configured to detect a bird that could be harmed by or that could harm the equipment and to determine the proximity of the bird to the equipment. The system also includes an unmanned aerial vehicle and a pilot system configured to control the unmanned aerial vehicle.

29 Claims, 11 Drawing Sheets

(56) References Cited

U.S. PATENT DOCUMENTS

| | | |
|---|---|---|
| 7,028,633 B2 | 4/2006 | Pinton et al. |
| 7,344,264 B2 | 3/2008 | Tamaoki |
| 7,511,624 B2 | 3/2009 | Shaw et al. |
| 2003/0174504 A1 | 9/2003 | Tamaoki |
| 2005/0162978 A1 | 7/2005 | Lima |
| 2005/0286346 A1 | 12/2005 | Croft et al. |
| 2008/0265095 A1 | 10/2008 | Lee et al. |
| 2008/0298962 A1 | 12/2008 | Sliwa |
| 2009/0034259 A1 | 2/2009 | Laufer |
| 2009/0169379 A1* | 7/2009 | McClintic ............ F03D 7/0236 416/31 |
| 2009/0185900 A1 | 7/2009 | Hirakata et al. |
| 2010/0223861 A1* | 9/2010 | Warwick ............... A01M 29/32 52/101 |
| 2010/0230531 A1* | 9/2010 | Fayed ..................... F41F 1/06 244/30 |
| 2010/0236497 A1 | 9/2010 | Philiben et al. |
| 2011/0054691 A1 | 3/2011 | Lee et al. |
| 2011/0144829 A1 | 6/2011 | Kim et al. |
| 2011/0215585 A1* | 9/2011 | Caires .................. F03D 1/0675 290/55 |
| 2012/0113754 A1 | 5/2012 | Husseiny et al. |
| 2013/0249218 A1* | 9/2013 | Vassilev ............... A01M 29/16 290/55 |
| 2013/0257641 A1* | 10/2013 | Ronning ................ G01S 13/42 342/54 |
| 2013/0320103 A1* | 12/2013 | Margalit ................ B64D 45/00 239/1 |

FOREIGN PATENT DOCUMENTS

| | | |
|---|---|---|
| WO | WO/00/07440 | 2/2000 |
| WO | WO/03/101192 | 12/2003 |
| WO | WO 2010/023253 | 3/2010 |
| WO | WO/2010/023523 | 3/2010 |

OTHER PUBLICATIONS

PCT International Search Report; International App. No. PCT/US2013/071691; Feb. 27, 2014; pp. 1-3.

PCT International Search Report; International App. No. PCT/US2013/071688; Feb. 27, 2014; pp. 1-3.

American Technology Announces LRAD(R) Order for Bird and Waterfowl control and Protection, Reuters, Jan. 15, 2009, 2 pages.

Barbagallo et al., "Modulation and Demodulation of Steerable Ultrasound Beams for Audio Transmission and Rendering" Proc. of the 11th Ing. Conference on Digital Audio Effects, Espoo, Finland, Sep. 1-4, 2008, 6 pages.

Fredin, Johan, "Speaker that used the non-linearity in air to create sound" Master's Degree Thesis, Mar. 2005, 48 pages.

Hristov, Nickolay, "What moths tell bats in the heat of battle" BATS Magazine, vol. 22, No. 2 Summer 2004, 2 pages.

* cited by examiner

METHODS AND SYSTEMS FOR DIRECTING BIRDS AWAY FROM EQUIPMENT

CROSS REFERENCE TO RELATED APPLICATIONS

This application is related to U.S. application Ser. No. 13/686,444, titled "Methods and Systems for Directing Birds Away from Equipment," filed Nov. 27, 2012, which is incorporated herein by reference in its entirety.

BACKGROUND

Birds have been known to fly into wind turbines, often resulting in the bird being injured or killed. To repel birds, certain techniques, such as noise cannons are used, but these methods can quickly become ineffective when the birds adapt to the steady stimulus.

SUMMARY

One exemplary embodiment relates to a system for directing a bird away from equipment that includes an item of equipment and a detector configured to detect a bird that could be harmed by or that could harm the equipment and to determine the proximity of the bird to the equipment. The system also includes an unmanned aerial vehicle and a pilot system that is configured to control the unmanned aerial vehicle.

Another exemplary embodiment relates to a method for directing a bird by operating an unmanned aerial vehicle to direct the flight of the bird.

Another embodiment relates to a system for directing a bird that includes a gradient field that is configured to influence the flight path of the bird and an emitter configured to generate the gradient field.

Another exemplary embodiment relates to a method for directing a bird by generating a gradient field with an emitter and deploying the gradient field to influence the flight path of the bird.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein when taken in conjunction with the accompanying drawings.

BRIEF DESCRIPTION OF THE FIGURES

The above and other objects, features and advantages of the invention will become apparent from a consideration of the subsequent detailed description presented in connection with accompanying drawings, in which.

DETAILED DESCRIPTION

Referring generally to the Figures, systems and methods for safely directing birds outside of a specified area or in a desirable direction are shown and described. While as a matter of convenience, "birds" are referred to frequently with reference to the examples provided herein, it is to be understood that the various inventive concepts disclosed in this application are also applicable to other types of flying animals (e.g., bats) and non-flying animals (e.g., squirrels, rabbits, etc.).

Figure 1:
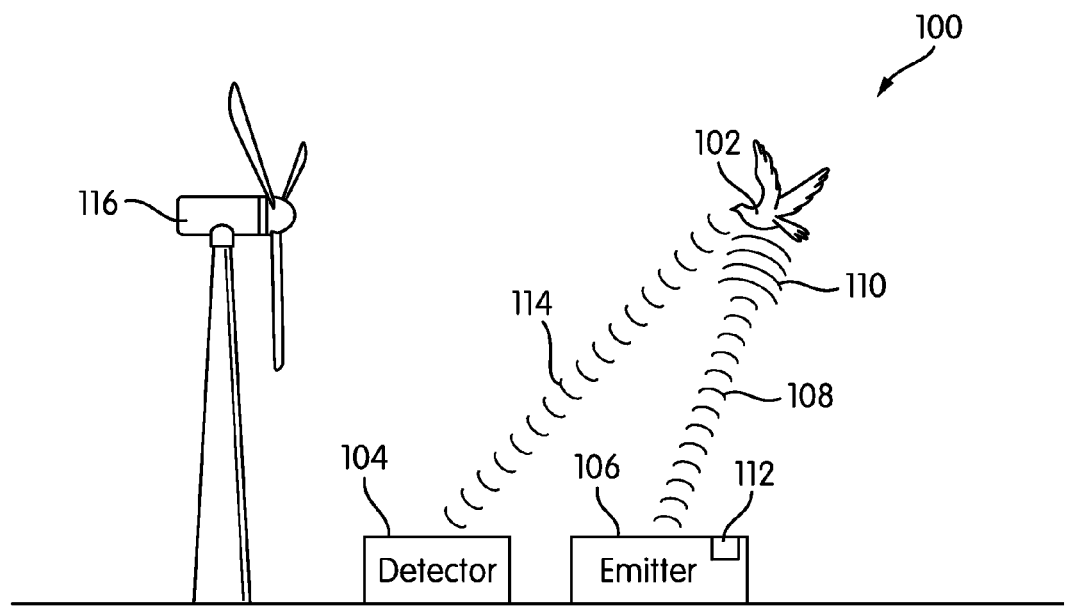
FIG. 1 is a schematic diagram of a system with a detector and an emitter, shown according to an exemplary embodiment.

Referring to FIG. 1, a schematic diagram of system 100 for executing the systems and methods of the present disclosure is shown, according to an exemplary embodiment. System 100 includes a detector 104, which is configured to detect a bird 102 within a specified area using a signal 114. For example, detector 104 may be configured to detect the bird 102 within a specified radius around a wind tower or wind farm. Detector 104 may be configured to identify the type of bird 102. In an exemplary embodiment, detector 104 is a camera. The camera is configured to capture images of the bird to determine the type of bird. For example, the camera is configured to capture the wing beats, size, color, appearance, and behavior of the bird. The camera may use an imaging technology that senses infrared radiation. The camera may also be similar to a surveillance camera. Detector 104 may be configured to identify the type of bird (or other animal).

System 100 includes an emitter 106. Emitter 106 is configured to emit (e.g., beam, transmit, send, etc.) an ultrasonic sound beam 108. The term "ultrasonic" applied to sound in this application refers to anything above the audible frequencies of sound for humans (approx. 20 kHz). Emitter 106 may be configured to transmit the ultrasonic portion of beam 108 in a specified direction. Emitter 106 may achieve high directivity (narrowness) by using ultrasonic sound. The ultrasonic sound has shorter wavelengths than audible frequency sound, increasing its directivity. The ultrasonic sound beam 102 is configured to demodulate or down-convert from an ultrasonic sound to an audible sound 110 for the bird 102. The audible sound frequency bandwidth is dependent upon the hearing range of the subject. For example, the audible sound range for humans is in the range of approximately 20 Hz to 20 kHz, but birds and other animals (e.g. bats) have different audible sound frequency ranges. Therefore, the term "audible sound" is not intended to refer to a particular fixed frequency band and instead simply refers to the range of hearing of the subject animal. Modulation is the process of including information (such as a voice) onto a carrier signal, usually sinusoidal in shape, in order to transmit that information. Emitter 106 is configured to transmit ultrasonic sound 108, which is then down-converted (i.e., the frequency of the sound wave decreases) through the nonlinear propagation characteristics in air to create an audible sound 110 at or near the bird 102. This happens when two sound waves with different frequencies are radiated simultaneously in the same medium, e.g., air, and a third sound wave having a frequency equal to the sum and difference of the two waves is produced by the nonlinear interaction (parametric interaction) of the two sound waves. Accordingly, if the difference between the two ultrasonic sound waves is within the audible frequency range for the target animal, an audible sound is generated by the parametric interaction. The audible sound modulated into the high frequency ultrasonic carrier sound (audio-modulated sound) may be selected to attract or repel the bird 102. For example, a sound of a predator may be selected to repel the bird 102 and a sound of a mate or prey may be selected to direct (e.g., attract or repel) the bird 102. As another example, the audible sound may be similar to the mobbing calls (i.e. calls to harass a predator) of a mobbing species of bird. Such mobbing calls may provide a signal to nearby birds to join in on the mobbing activity and may differ in frequency depending upon the situation. Therefore, the frequency of the audible sound may be selected (e.g., in a range between 4 kHz and 8 kHz) to promote the desired activity of nearby birds. As yet another example, the audible sound may be specifically configured for use with bats (e.g., similar to warning sounds produced by tiger moths as a defense against bats).

System 100 may include a director 112, which is configured to direct the ultrasonic sound beam toward the bird 102 away from an object, such as a wind turbine 116.

Figure 2:
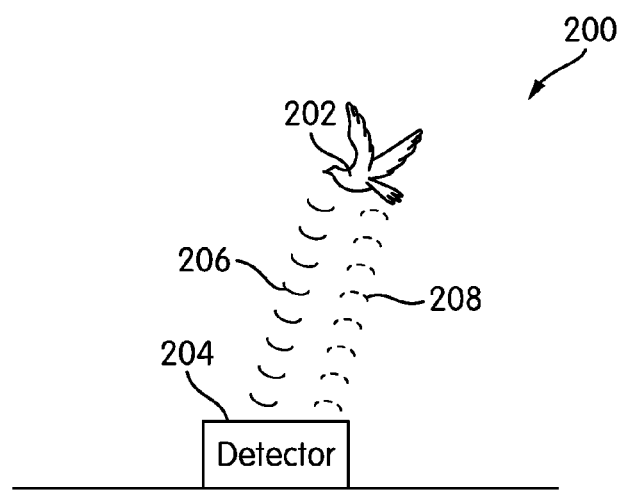
FIG. 2 is a schematic diagram of a system with a detector configured to detect a bird, shown according to another embodiment.

Now referring to FIG. 2, a schematic diagram of system 200 for executing the systems and methods of the present disclosure is shown, according to an exemplary embodiment. System 200 includes a detector 204 configured to detect a bird 202. In an exemplary embodiment, detector 204 is configured to determine the location of the bird 202. System 200 includes a director 212 to direct the ultrasonic sound beam toward the bird 202 based on the location of the bird 202. The system may include an acoustic detector to determine a location of the audible sound and that location may be compared to the actual location of the bird 202. The result of the comparison may be used to modify the direction or amplitude of audio-modulated ultrasonic sound.

Figure 3:
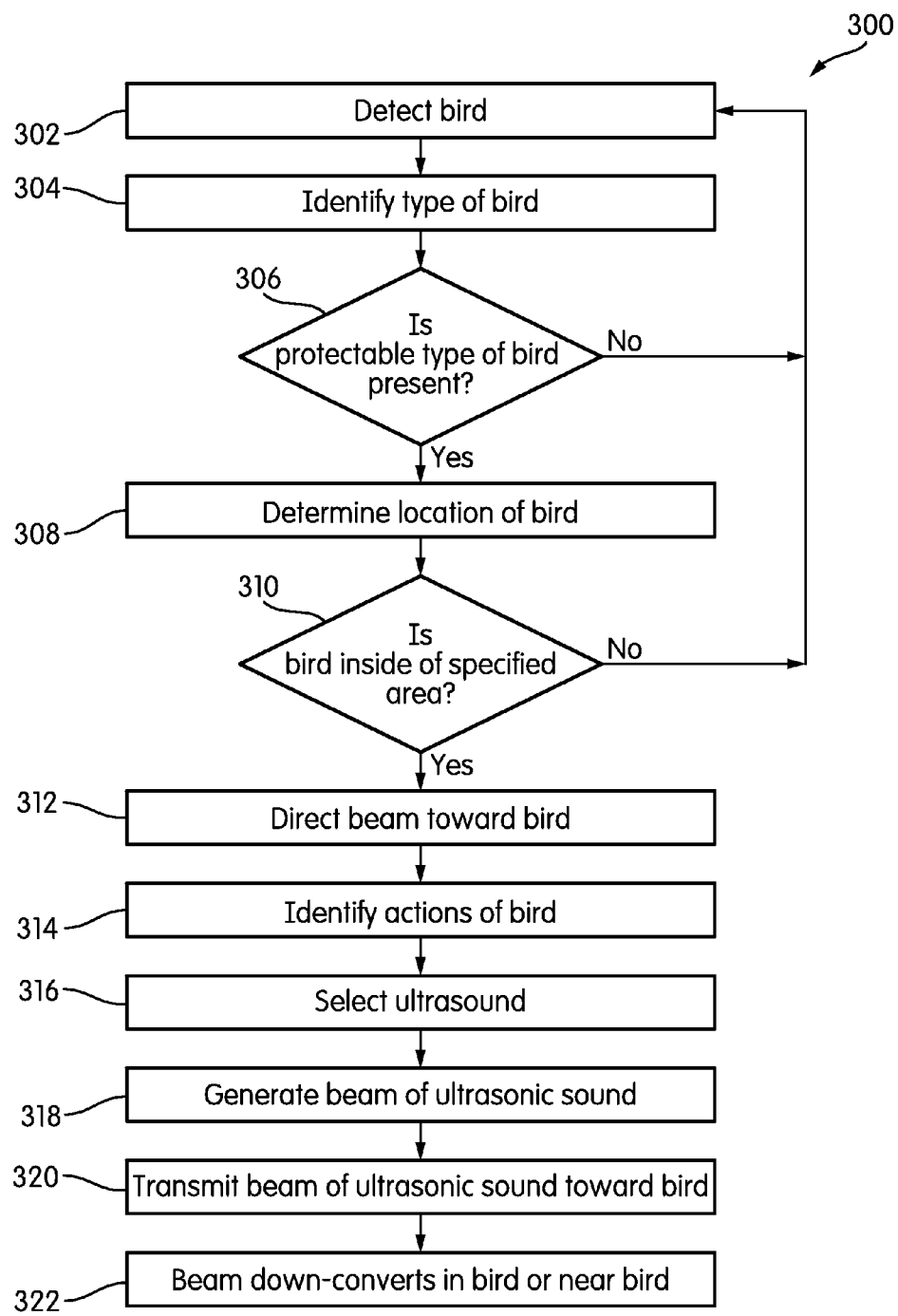
FIG. 3 is a flowchart of a method for directing a bird, shown according to an exemplary embodiment.

Now referring to FIG. 3, a flow diagram of method 300 for directing a bird is shown, according to an exemplary embodiment. Method 300 includes detecting the bird (step 302). In one embodiment, the detector uses radar. Radar is an object-detection system that uses radio waves to determine the direction, range, altitude, or speed of objects. In another embodiment, the detector uses LIDAR. LIDAR is an optical remote sensing technology that can measure the distance to, or other properties of a target by illuminating the target with light. For example, it may use pulses from a laser. In another embodiment, the detector uses ultrasonic sound. In another embodiment, the detector uses a camera or multiple stereoscopic cameras. Method 300 further includes identifying the type of bird (step 304). In one embodiment, the detector identifies that the bird is ringed (i.e. tagged with an identifying band) and uses that information to identify the type of bird. If the detected bird is identified as a type of bird that should be directed, for example, a raptor, the detector will determine the location of the bird (step 308). The word "directing" is used to mean regulate and control or influence the course of flight of the bird toward a certain desirable area or away from an undesirable area. If the bird is located within the specified area, then the beam will be directed toward the bird (step 310).

The detector is configured to identify the actions of the bird (step 314). In one exemplary embodiment, the detector identifies if the bird is flying in a vertical or horizontal direction or toward or away from the circumference of the specified area. Based on the actions of the bird, an ultrasonic sound may be selected (step 316), a beam of ultrasonic sound generated (step 318) via, e.g., a propagator, such as an ultrasonic transducer or speaker, and the beam then transmitted toward the bird (step 320). The ultrasonic sound beam is configured to down-convert to audible sound in the bird or near the bird (step 322). The emitter is configured to direct the beam of ultrasonic sound toward the bird so that the ultrasonic sound down-converts to an audible sound directly in the tissues of the bird's body (i.e., the density of the bird's body acts to down-convert the high frequency ultrasonic sound to lower frequency audible sound). In another embodiment, the emitter is configured to beam the ultrasonic sound toward the bird where the atmosphere demodulates or down-converts the ultrasonic sound to audible sound at or near the bird.

In an alternative embodiment, a first emitter transmits a first ultrasonic sound beam and a second emitter transmits a second ultrasonic sound beam. These beams may be co-propagating or they may be emitted from different directions. The down-conversion occurs where the beams are co-focused or intersect. The emitters are configured to beam ultrasonic sound that down-converts or demodulates to audible sound when the beams overlap either in the bird or near the bird.

Figure 4:
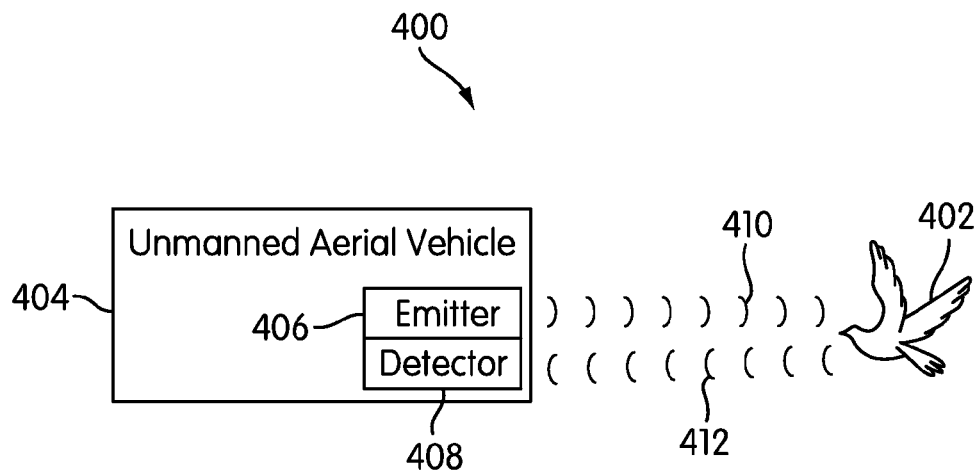
FIG. 4 is a schematic diagram of a system of an unmanned aerial vehicle having an emitter configured to beam an ultrasonic sound and an on-board detector, shown according to another embodiment.

Now referring to FIG. 4, a schematic diagram of system 400 for executing the systems and methods of the present disclosure is shown, according to an exemplary embodiment. System 400 includes an unmanned aerial vehicle 404 having an on-board detector 408. The unmanned aerial vehicle 404 may have an appearance selected to influence bird 402 (e.g., an appearance similar to a predator of bird 402). In some instances the unmanned aerial vehicle 404 may change appearance depending upon the type of bird 402. The unmanned aerial vehicle 404 may also have a method of flight selected to influence bird 402 (e.g., a flight pattern similar to a predator of bird 402 and that may be changed depending upon the type of bird 402). In one embodiment, detector 408 uses radar. In another embodiment, detector 408 uses LIDAR. In another embodiment, detector 408 uses ultrasonic sound. In another embodiment, detector 408 uses a camera. The camera, for example, is configured to detect signal 412 and locate the bird 402.

System 400 includes a pilot system that is configured to control unmanned aerial vehicle 404 and navigate unmanned aerial vehicle 404 based on the type, location, and actions of the bird. In an exemplary embodiment, unmanned aerial vehicle 404 is a robot that can operate without the need for a human controller. In another embodiment, unmanned aerial vehicle 404 is a robot receiving automatic instructions from a sensor grid. In another embodiment, unmanned aerial vehicle 404 may be remotely piloted by a person. Actions are determined by the operator based upon either direct visual observation or remote viewing through a camera. System 400 further includes unmanned aerial vehicle 404 with an emitter 406 that is configured to transmit an ultrasonic beam 410 toward the bird 402. In another exemplary embodiment, the unmanned aerial vehicle may include a monitor (e.g., video camera) to document encounters between the unmanned aerial vehicle and the bird 402. The monitor may include a recorder so that video or other data is preserved for later review. In this embodiment, the encounter recorder may be used to document adherence to protocols selected to avoid harming the bird 402 (e.g., external protocols or regulations set by governmental entities).

Figure 5:
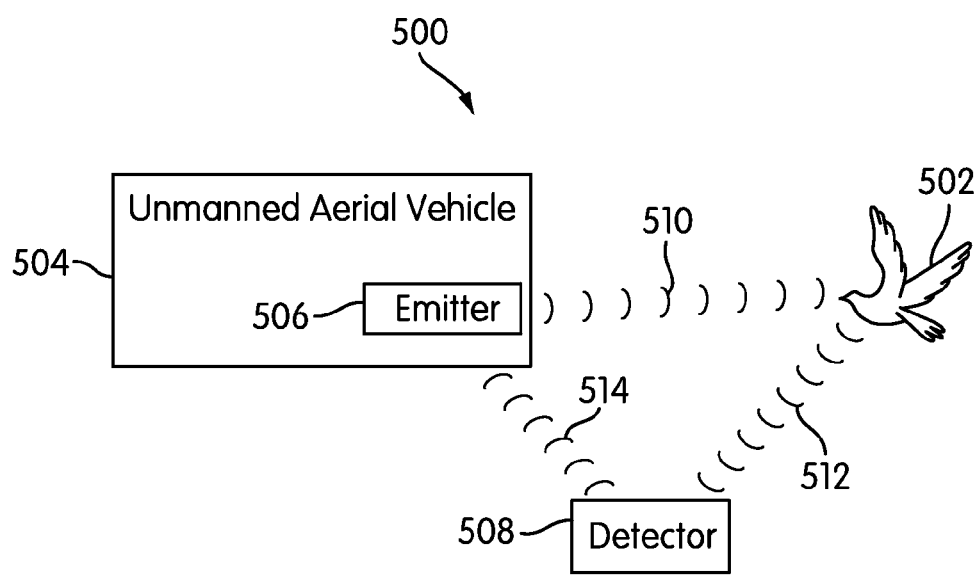
FIG. 5 is a schematic diagram of a system of an unmanned aerial vehicle having an emitter configured to beam an ultrasonic sound and an off-board detector, shown according to another embodiment.

Now referring to FIG. 5, a schematic diagram of system 500 for executing the systems and methods of the present disclosure is shown, according to an exemplary embodiment. System 500 includes unmanned aerial vehicle 504 having an off-board detector 508. The off-board detector 508 may be located on the ground or on another object. In one embodiment, detector 508 uses radar. In another embodiment, detector 508 uses LIDAR. In another embodiment, detector 508 uses ultrasonic sound. In another embodiment, detector 508 uses a camera. The camera, for example, is configured to detect a signal 512 to locate the bird 502. Once the location of the bird 512 is identified, the system 500 may determine the proximity of the bird 512 to the equipment. The proximity may then be used to determine further actions. System 500 includes a pilot system that is configured to control unmanned aerial vehicle 504 and is configured to navigate unmanned aerial vehicle 504 based on the type, location, and actions of the bird. Detector 508 communicates with unmanned aerial vehicle 504 via a signal 514.

System 500 includes unmanned aerial vehicle 504 with an emitter 506 that is configured to transmit an ultrasonic sound beam 510 toward the bird 502. In a variation of system 500, the detector 508 or a second detector is a acoustic detector used to detect the audible sound created via the frequency down-conversion of the ultrasonic sound beam 510. The acoustic detector may be used to determine a location of the audible sound and that location may be compared to the actual location of the bird 502. The result of the comparison may be used to modify the direction or amplitude of audio-modulated ultrasonic sound.

Figure 6:
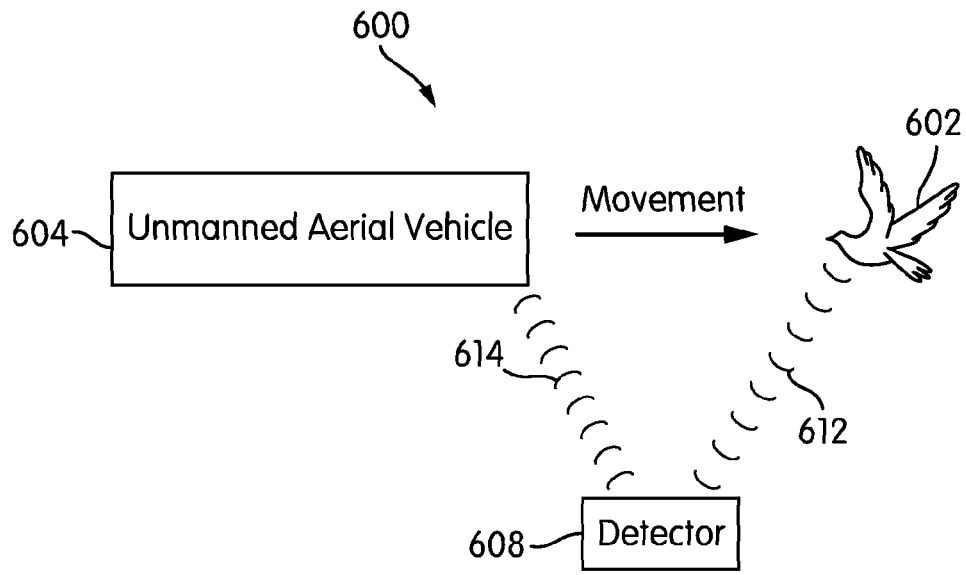
FIG. 6 is a schematic diagram of a system of an unmanned aerial vehicle, with an emitter, that is configured to direct a bird, shown according to another embodiment.

Now referring to FIG. 6, a schematic diagram of system 600 for executing the systems and methods of the present disclosure is shown, according to an exemplary embodiment. System 600 includes unmanned aerial vehicle 604 and detector 608. Detector 608 is off-board of unmanned aerial vehicle 604. Off-board detector 608 may be located on the ground, on another device, or in another location other than attached to unmanned aerial vehicle 604. In one embodiment, detector 608 uses radar. In another embodiment, detector 608 uses LIDAR. In another embodiment, detector 608 uses ultrasonic sound. In another embodiment, detector 608 uses a camera. The camera, for example, may detect the signal 612 to locate the bird 602. System 600 includes a pilot system that is configured to control unmanned aerial vehicle 604 and is configured to navigate unmanned aerial vehicle 604 based on the type, location, and actions of the bird. Detector 608 communicates with unmanned aerial vehicle 604 via signal 614. In another embodiment, detector 608 is on-board unmanned aerial vehicle 604. Unmanned aerial vehicle 604 is configured to navigate toward the bird 602 based on the type, location (e.g. location relative to equipment), and actions of the bird in order to direct the bird 602 to fly outside of a specified area.

Figure 7:
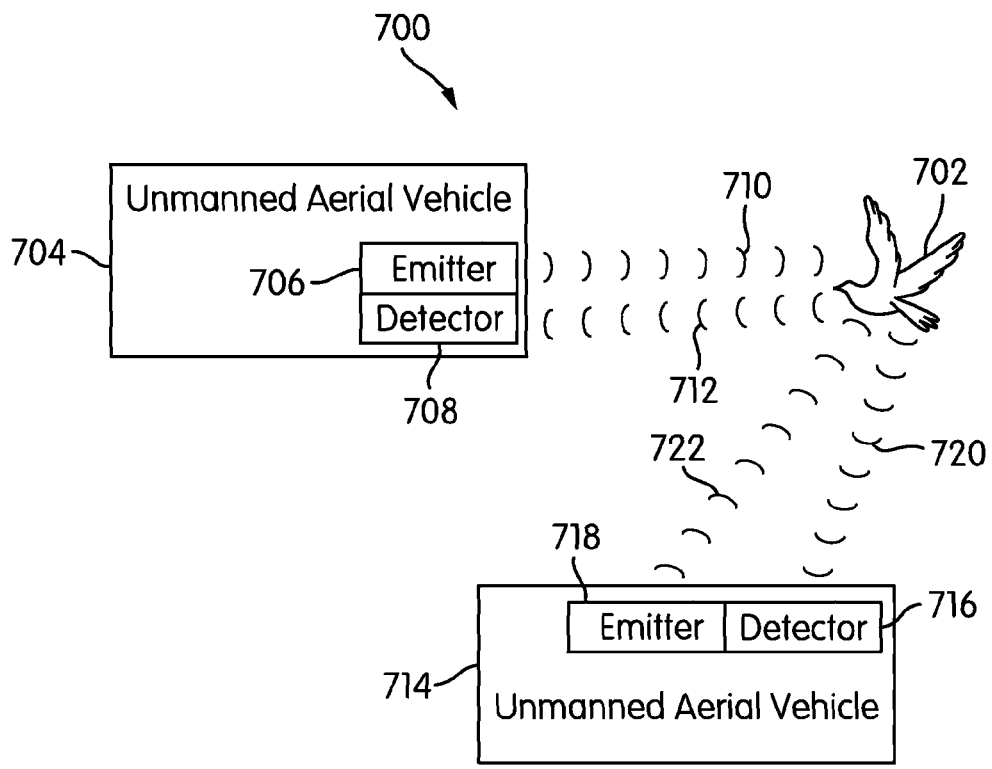
FIG. 7 is a schematic diagram of a system of unmanned aerial vehicles having emitters and detectors configured to direct a bird, shown according to an exemplary embodiment.

Now referring to FIG. 7, a schematic diagram of system 700 for executing the systems and methods of the present disclosure is shown, according to an exemplary embodiment. System 700 includes first unmanned aerial vehicle 704 including emitter 706 and detector 708 and second unmanned aerial vehicle 714 including emitter 716 and detector 718. System 700 includes a pilot system that is configured to control unmanned aerial vehicles 704 and 714 based on the type, location, and actions of the bird. First emitter 706 and second emitter 716 are configured to cooperatively work together to beam a first ultrasonic sound 710 and a second ultrasonic sound 720 toward the bird 702 to direct the bird 702 outside of a specified area.

System 700 includes first unmanned aerial vehicle 704 having on-board detector 708 and second unmanned aerial vehicle 714 having on-board detector 718. In one embodiment, detector 708 or detector 718 uses radar. In another embodiment, detector 708 or detector 718 uses LIDAR. In another embodiment, detector 708 or detector 718 includes ultrasonic sound. In another embodiment, the detector 708 or detector 718 uses a camera. The camera, for example is configured to detect signal 712 or signal 722 and locate the bird 702. In another embodiment, the camera has a detection system configured to instantly detect that the bird 702 is present. In another embodiment, the detector is an off-board detector configured to communicate with one or more unmanned aerial vehicles.

In another embodiment, first unmanned aerial vehicle 704 and second unmanned aerial vehicle 714 are configured to navigate toward the bird 702 based on the type, location, and actions of the bird in order to direct the bird 702 to fly outside of a specified area. The movement toward the bird may startle the bird and direct it to fly away from the unmanned aerial vehicles.

Figure 8:
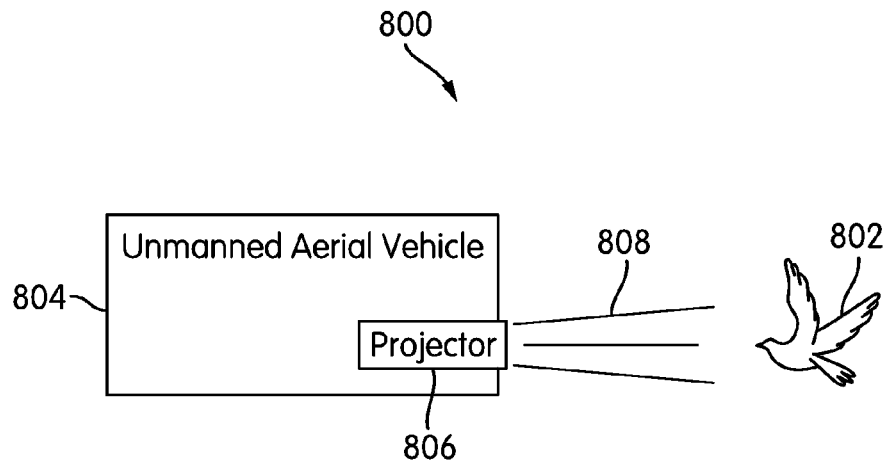
FIG. 8 is a schematic diagram of an unmanned aerial vehicle configured to project a substance toward a bird, shown according to an exemplary embodiment.

Now referring to FIG. 8, a schematic diagram of system 800 for executing the systems and methods of the present disclosure is shown, according to an exemplary embodiment. System 800 includes unmanned aerial vehicle 804 and projector 806 configured to project a substance 808 toward a bird 802. In one embodiment, substance 808 is an odorant. In another embodiment, substance 808 may be an aerosol. In another embodiment, substance 808 may be paint. In another embodiment, substance 808 may be water. In another embodiment, substance 808 may be a light beam. Projector 806 is configured to project substance 808 toward the bird 802 to startle it and direct the bird out of a specified area or direction of flight. In various embodiments, unmanned aerial vehicle 804 may have an attractive design, for example, a painting of a rabbit or a small bird, to attract the bird 802 toward the unmanned aerial vehicle 804. Unmanned aerial vehicle 804 is generally configured to direct the bird 802 outside of a specified area.

Figure 9:
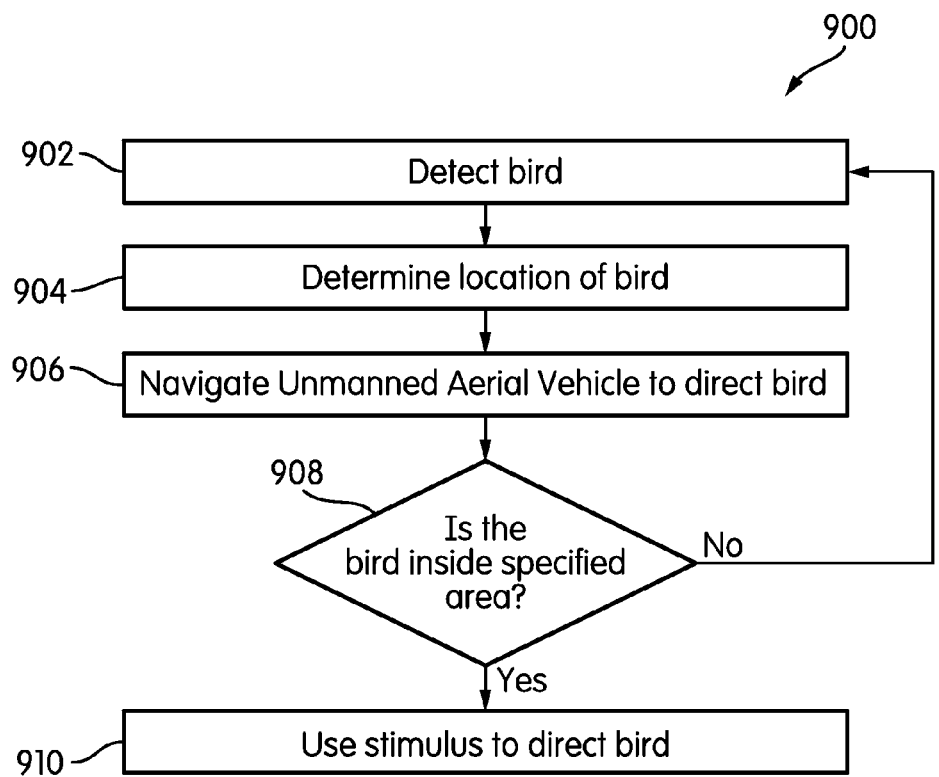
FIG. 9 is a flowchart of a method for directing a bird by operating an unmanned aerial vehicle to interact with birds to direct the bird, shown according to an exemplary embodiment.

Now referring to FIG. 9, a flow diagram of method 900 for directing a bird by operating an unmanned aerial vehicle to interact with the bird is shown, according to an exemplary embodiment. The unmanned aerial vehicle is configured to detect the bird (step 902) and determine the location of the bird (step 904). The unmanned aerial vehicle is configured to direct the bird. For example, the unmanned aerial vehicle may use various systems and methods to encourage the bird to fly in a desired direction away from an object, such as a wind turbine, which may cause it harm. In one embodiment, the unmanned aerial vehicle may be configured to navigate robotically. In another embodiment, the unmanned aerial vehicle may be configured to be piloted remotely. The unmanned aerial vehicle may act in a similar manner to a goalie. For example, the unmanned aerial vehicle may be configured to hover between the bird and an object, such as a wind turbine, to block the bird from flying into the object and to direct the bird around the unmanned aerial vehicle and an object. The unmanned aerial vehicle may fly toward the bird to direct the bird away from itself. In one embodiment, the intensity of the actions of the unmanned aerial vehicle may be increased as the bird gets closer to the object (e.g. larger darting motions, more threatening actions, etc.).

The detector determines if the bird is within a specified area (step 908). If the bird is flying within a specified area, the unmanned aerial vehicle may use a stimulus to direct the bird (step 910). In one embodiment, the stimulus is a light, which flashes as the unmanned aerial vehicle navigates toward or away from the bird. In another embodiment, the stimulus is sound, which emits as the unmanned aerial vehicle navigates toward the bird. In another embodiment, the stimulus is a substance. For example, the substance may be an odorant, an aerosol, paint, or water. In another embodiment, the unmanned aerial vehicle is designed to attract the bird with a stimulus and direct the bird outside of a specified area. For example, the emitter may play a sound of prey or a mate or the unmanned aerial vehicle includes a picture of a prey on it. After the stimulus is used on the bird, the detector determines the location of the bird (step 904) and the process continues as described above until the bird is no longer detected within the specified area.

In another embodiment, the unmanned aerial vehicle includes a sensor to monitor the proximity of the unmanned aerial vehicle to the bird. The sensor (e.g., a camera, a radar) can be used to report and/or record the interaction of the unmanned aerial vehicle with the bird. This record may be used to document that the encounter does (or does not) comply with protocols selected to avoid harming the bird. If the unmanned aerial vehicle is within a specified distance of the bird, the unmanned aerial vehicle will be configured to navigate away from the bird. In one embodiment, the sensor is on-board of the unmanned aerial vehicle. In another embodiment, the sensor is off-board of the unmanned aerial vehicle.

Figure 10:
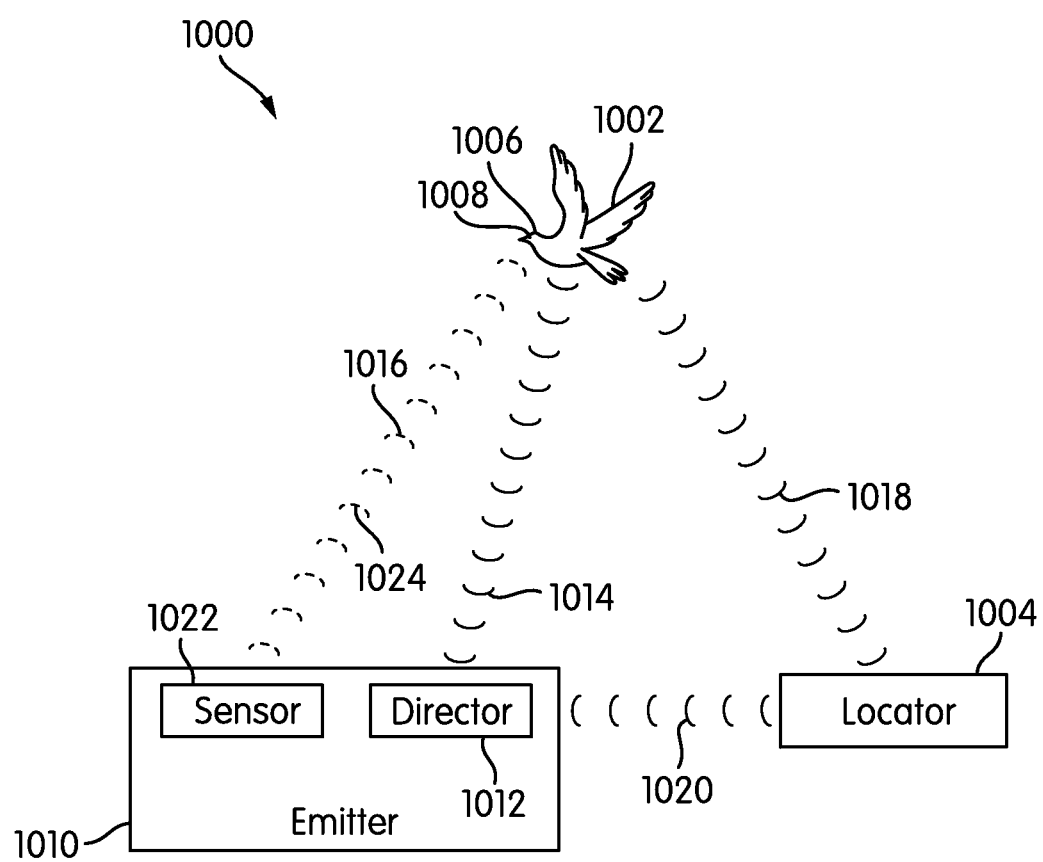
FIG. 10 is a schematic diagram of a system with a locator configured to determine an orientation of at least a portion of the bird and to emit a laser beam toward a bird, shown according to an exemplary embodiment.

Now referring to FIG. 10, a schematic diagram of system 1000 for executing the systems and methods of the present disclosure is shown, according to an exemplary embodiment. System 1000 includes a system with a locator 1004 to determine an orientation of at least a portion of a bird 1002, a director 1012 to move a beam 1014, and an emitter 1010 to transmit the beam 1014 toward the bird 1002. In another embodiment, system 1000 includes a light. In another embodiment, system 1000 includes a speaker. Locator 1004 determines the orientation of the bird 1002. For example, locator 1004 may determine the head or eye orientation of the bird 1002 using a sensor 1022 that detects the direction of the head or eyes of the bird 1002. If the bird 1002 is not orientated toward the emitter 1010, then the emitter 1010 may use a stimulus to attract the attention of the bird 1002. For example, the stimulus may be a beam 1014 of low-intensity light or a sound to attract the bird's attention, to attract its gaze, and then to give it direction. If the head 1006 or eyes 1008 of the bird 1002 are orientated in the direction of the emitter 1010, then locator 1004 will signal 1020 director 1012 to move in the direction of the head 1008 or eyes 1006 of the bird 1002. The emitter 1010 may generate and transmit the signal 1014 at the head 1008 or eyes 1006 of the bird.

In one embodiment, system 1000 includes sensor 1022 configured to monitor the intensity of beam 1016 to ensure that power stays within specified limits to prevent injury to the bird 1002. In another embodiment, sensor 1022 is configured to monitor a reflection of the beam 1024 to ensure that power stays within specified limits.

Figure 11:
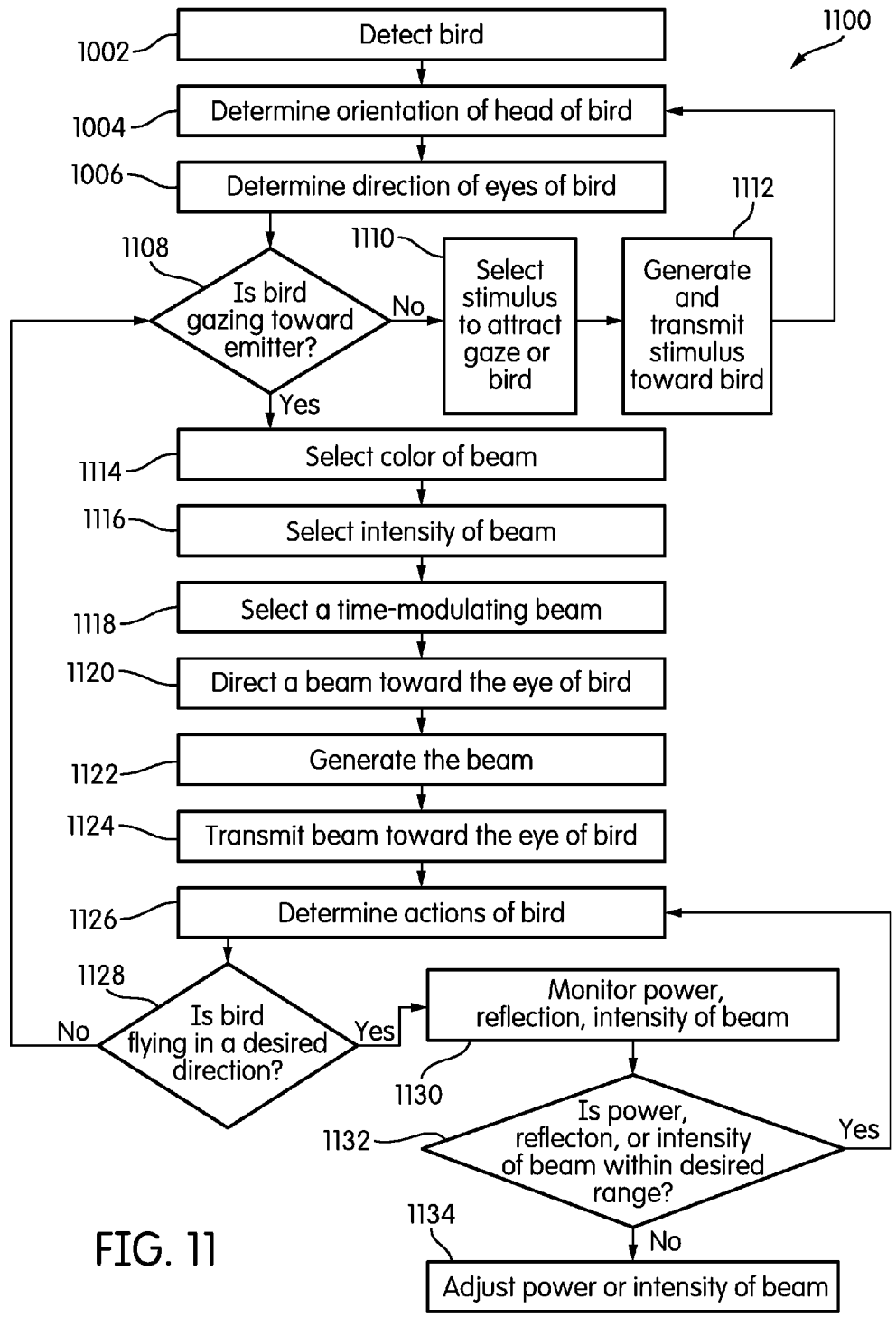
FIG. 11 is a flowchart of a method for determining an orientation of at least a portion of a bird and emitting a laser beam toward the bird in response to the orientation of the bird, shown according to an exemplary embodiment.

Now referring to FIG. 11, a flow diagram of method 1100 for determining an orientation of at least a portion of a bird and emitting a beam toward the bird in response to the orientation of the bird is shown, according to an exemplary embodiment. A detector is configured to detect the bird within a specified area (step 1102). A locator is configured to determine the orientation of the bird (step 1104). For example, the locator is configured to determine the orientation of a head of the bird. The locator is configured to determine an orientation of the eyes of the bird (step 1106). For example, the locator is configured to determine the orientation of the gaze of the bird. If the gaze of the bird is not toward the emitter, then the system may select a stimulus to attract the gaze of the bird (step 1110) and then the emitter may generate and transmit the stimulus toward the bird (step 1112). The locator will again determine the orientation of the head (step 1104) and eyes (step 1106) of the bird.

In one embodiment, the system is configured to determine the type of bird. If the gaze of the bird is toward the emitter, then the system may select a color of a beam (step 1114), an intensity of the beam (step 1116), and a time-modulating beam (step 1118), based on the type of bird. Once selected, the director will orient the beam in the direction of the eye of the bird (step 1120). The laser beam will be generated (step 1122) and transmitted toward the eye of the bird (step 1124).

The system is configured to determine the actions of the bird (step 1126). If the bird is flying in a preferred direction (step 1128), then the sensor will monitor one or more of the following aspects of the laser beam: power, reflection, or intensity (step 1130). The sensor is configured to determine if the power, reflection, or intensity are within the desired ranges (step 1132). If these are not within the desired ranges, the emitter will adjust the power of the laser beam (step 1134) and the system will determine if the bird is flying in a desired direction (step 1128). The power, reflection, or intensity will be monitored (step 1130) and if these are within a desirable range (step 1132), the system will continue to determine the actions of the bird (step 1126) and proceed with the above steps until the bird is outside of a specified area.

Figure 12:
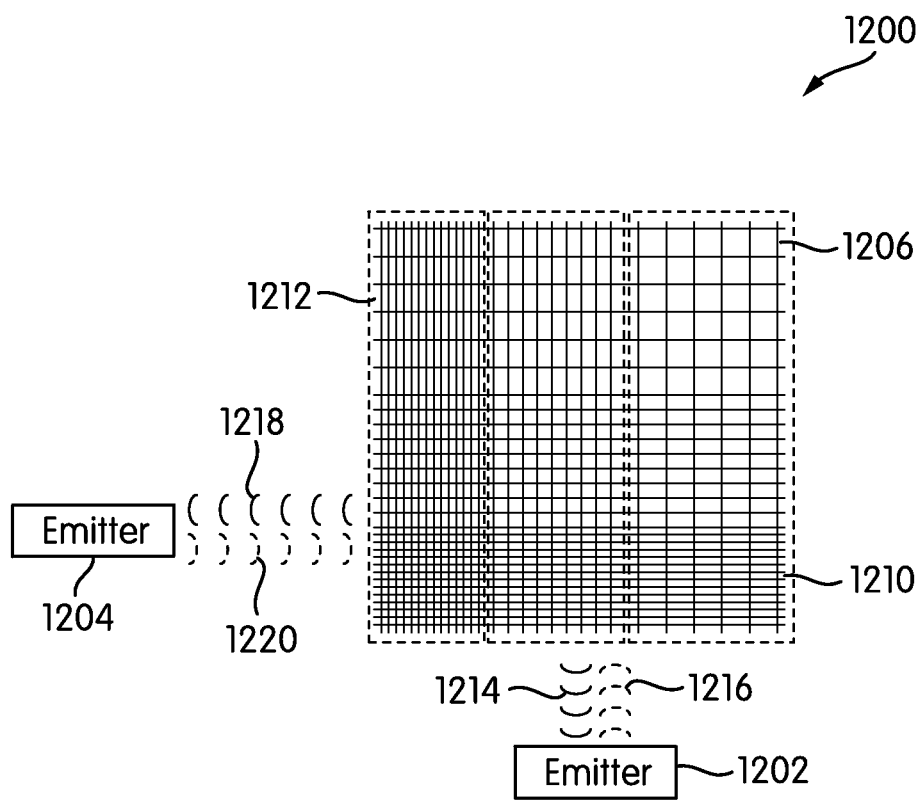
FIG. 12 is a schematic diagram of a gradient field with an emitter configured to direct a bird, shown according to an exemplary embodiment.

Now referring to FIG. 12, a schematic diagram of system 1200 for executing the systems and methods of the present disclosure is shown, according to an exemplary embodiment. System 1200 includes a gradient field with first emitter 1202 and second emitter 1204, which are configured to direct a bird. System 1200 includes a low gradient field

1206, a first high gradient field 1210, and a second high gradient field 1212. Emitter 1202 and emitter 1204 are configured to work cooperatively together to generate a high gradient field in an area that the bird is being directed away from and a low gradient field where the bird is directed toward. In another embodiment, system 1200 includes a director configured to move the emitters beaming the gradient fields with respect to the bird in order to steer the bird outside of a specified area.

In one exemplary embodiment, system 1200 may include a speaker. Emitter 1202 may be configured to beam a sound 1214 in a direction and emitter 1204 may be configured to beam a sound 1218 in a direction to create a gradient field of sound. The gradient may represent differences in the intensity of the sound or in the frequency, i.e., pitch, of the light. In one embodiment the gradient field of sound is configured to be transmitted in such a way that the intensity is high in an area the bird should not be in and low in an area the bird is being directed toward. For example, the beam of sound may be ultrasound with a high gradient of sound transmitted toward the bird 1202 to direct it to fly in another direction with a low gradient field of sound.

In another embodiment, system 1200 may include a light. Emitter 1202 may be configured to beam light 1214 in a direction and emitter 1204 may be configured to beam light 1218 in a direction to create a gradient field of light. The gradient may represent differences in the intensity of the light or in the frequency, i.e., color, of the light. In one embodiment the gradient field of light is configured to be transmitted in such a way that the intensity is high in an area the bird should not be in and low in an area the bird is being directed toward. In one embodiment, system 1200 is configured to receive a first light signal 1216 and a second light signal 1220. System 1200 may include a camera to track the location of the bird.

In one exemplary embodiment, system 1200 includes a material. Emitter 1202 is configured to beam a material 1214 in a direction and emitter 1204 is configured to beam material 1218 in a direction to create a gradient field of material. The gradient field of material is configured to be transmitted in such a way that the amount of material is high in an area the bird should not be in and low in an area the bird is being directed toward. In an exemplary embodiment, the material field includes water. In another embodiment, the material field includes steam. In another embodiment, the material field includes dust. For example, the dust may include talc.

In one exemplary embodiment, system 1200 includes the gradient field as a function of time. In another embodiment, system 1200 includes the gradient field as a function of space.

Figure 13:
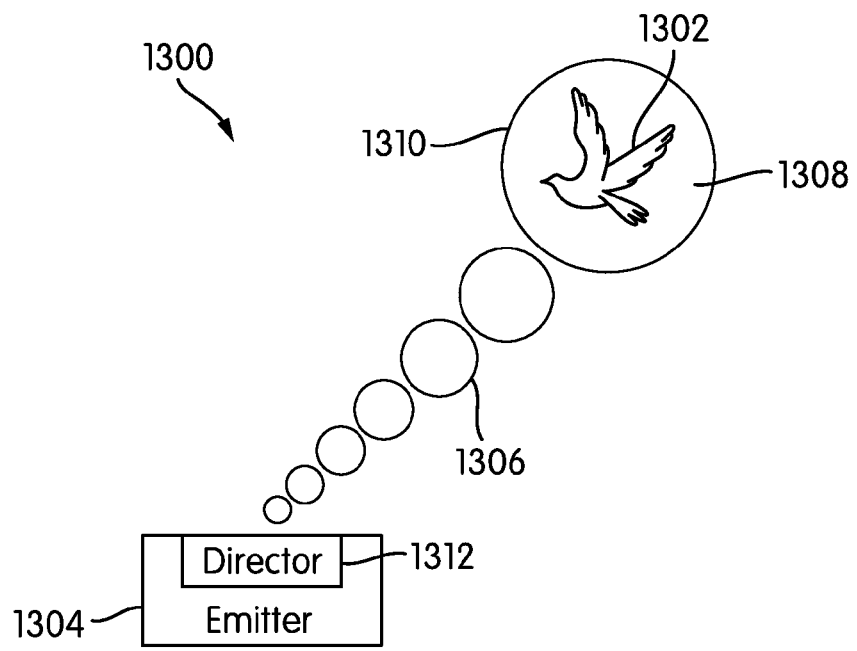
FIG. 13 is a schematic diagram of a gradient field with a steering field to direct a bird, shown according to an exemplary embodiment.

Now referring to FIG. 13, a schematic diagram of system 1300 for executing the systems and methods of the present disclosure is shown, according to an exemplary embodiment. System 1300 includes a gradient field with a steering field to direct a bird 1302. System 1300 includes an emitter 1304 configured to emit a gradient field 1306, and a director 1312 configured to direct the gradient field 1306 toward the bird 1302. The gradient field 1306 includes an area with a high gradient field 1310 and an area with a low gradient field 1308. In one embodiment, the gradient field is in a conical shape, such that the low region of the gradient field 1308 is in close proximity to the bird 1302 and the high region of the gradient field 1310 is in the area surrounding the low region of the gradient field 1308 and the bird 1302. The director 1312 is configured to steer the gradient fields surrounding the bird 1302 in order to direct the bird 1302 outside of a specified area.

Figure 14:
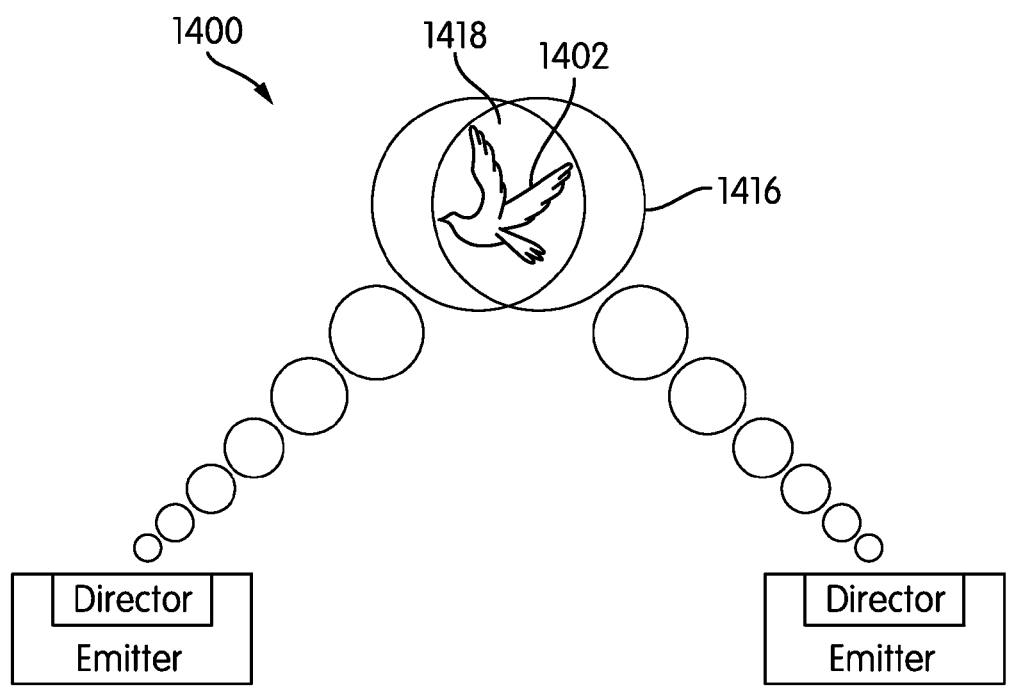
FIG. 14 is a schematic diagram of a second gradient field used in connection with a first gradient field that have steering fields to direct a bird, shown according to an exemplary embodiment.

Now referring to FIG. 14, a schematic diagram of system 1400 for executing the systems and methods of the present disclosure is shown, according to an exemplary embodiment. System 1400 includes a plurality of systems 1300 working in connection with each other to direct a bird 1402. A first director 1414 and a second director 1416 are configured to move a first beam 1406 and a second beam 1410, respectively, toward the bird 1402. First emitter 1404 is configured to transmit a first gradient field 1406 and second emitter 1408 is configured to transmit a second gradient field 1410 toward the bird 1402. The gradient field includes an area with a high gradient field 1416 and an area with a low gradient field 1418 and are configured to move cooperatively to create a steering field to direct the bird 1402 outside of a specified area.

Figure 15:
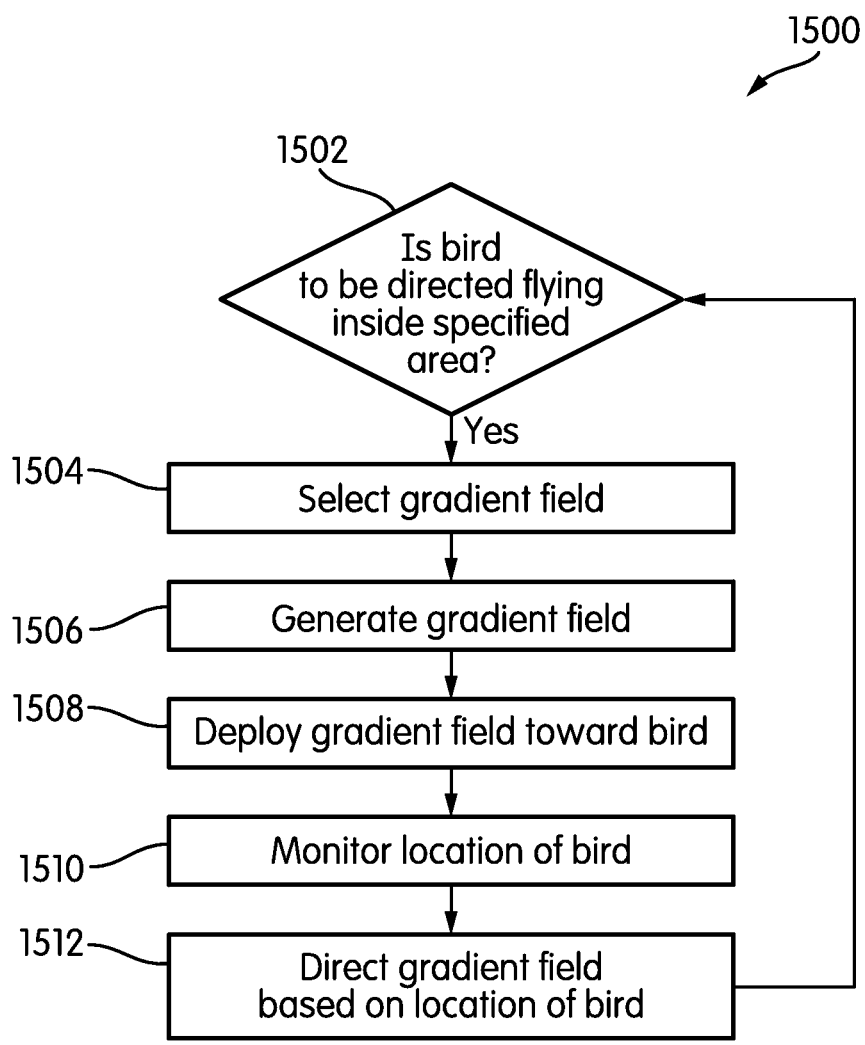
FIG. 15 is a flowchart of a method of generating and deploying a gradient field to direct a bird, shown according to an exemplary embodiment.

Now referring to FIG. 15, a flow diagram of method 1500 of generating and deploying a gradient field to direct a bird is shown, according to an exemplary embodiment. System 1500 is configured to detect if a bird to be directed is within a specified area (step 1502). If present, system 1500 is configured to select a gradient field (step 1504), generate a gradient field (step 1506), and deploy a gradient field toward the bird (step 1508). System 1500 is configured to monitor the location of the bird (step 1510) and direct the gradient field based on the location of the bird (step 1512). System 1500 is configured to direct the bird outside of a specified area by using at least one gradient field. The gradient field may include a low region and a high region, in which system 1500 is configured to beam the low region of the gradient field in close proximity to the bird and the high region of the gradient field surrounding the low gradient field, which creates a steering field to direct the bird along a desired path.

Figure 16:
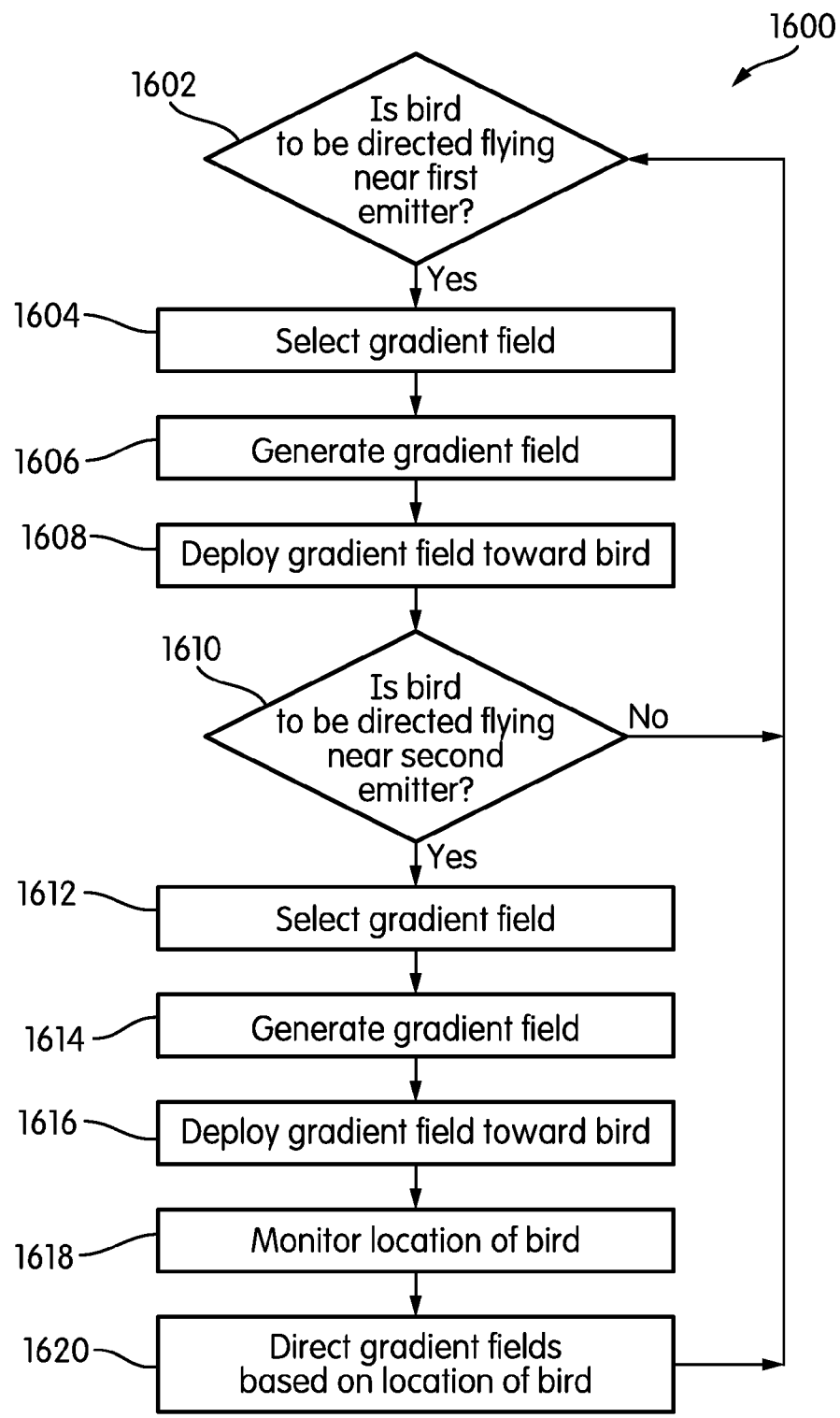
FIG. 16 is a flowchart of a method of generating a second gradient field used in connection with a first gradient field to direct a bird, shown according to another embodiment.

Now referring to FIG. 16, a flow diagram of method 1600 of generating a second gradient field used in connection with a first gradient field to direct a bird is shown, according to an exemplary embodiment. System 1600 is configured to detect if a bird to be directed is within a specified area near a first emitter (step 1602). If present, system 1600 is configured to select a gradient field (step 1604), generate a gradient field (step 1606), and deploy the gradient field toward the bird (step 1608). System 1600 is configured to detect if a bird to be directed is within a specified area near a second emitter (step 1610). If present, system 1600 is configured to select a gradient field (step 1612), generate a gradient field (step 1614), and deploy the gradient field toward the bird (step 1616).

System 1600 is configured to monitor the location of the bird (step 1618) and direct the gradient field based on the location of the bird (step 1620). System 1600 is configured to direct the bird outside of a specified area by using more than one gradient field. The gradient fields may include a low region and a high region, in which system 1600 is configured to transmit the low region of the gradient field in close proximity to the bird and the high region of the gradient field surrounding the low gradient field, which creates a steering field to direct the bird along a desired path.

In one exemplary embodiment, the system monitors the number of birds it has protected or influenced. For example, the number of birds that the system has detected and directed away from a wind turbine would be counted.

The construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements as integrally formed may be constructed of multiple parts or elements. The elements and assemblies may be constructed from any of a wide variety of materials that provide sufficient strength of durability, in a wide variety of colors, textures, and combinations.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. The order or sequence of any processor method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the scope of the appended claims. Although the figures show a specific order of method steps, the order of the steps may differ from what is depicted. Also, two or more steps may be performed concurrently or with partial concurrence.

What is claimed is:

1. A system for directing a bird away from equipment, comprising:
   a detector configured to detect a bird that could be harmed by or that could harm an item of equipment and to determine the proximity of the bird to the equipment;
   an unmanned aerial vehicle comprising;
   a pilot system configured to control the unmanned aerial vehicle; and
   a plurality of emitters configured to generate a gradient field to influence the bird, wherein the plurality of emitters cooperatively generate a first intensity field in an area that the bird is being directed away from and a second intensity field having a lower intensity than the first intensity field where the bird is being directed toward.

2. The system of claim 1, wherein the unmanned aerial vehicle comprises an on-board detector.

3. The system of claim 1, wherein the detector comprises an off-board detector.

4. The system of claim 1, further comprising a second unmanned aerial vehicle.

5. The system of claim 4, wherein the first and second unmanned aerial vehicles cooperate to produce behavior that induces a particular flight path for the bird.

6. The system of claim 1, wherein the pilot system comprises robotic controls configured to operate the unmanned aerial vehicle.

7. The system of claim 1, wherein the pilot system is configured to allow the unmanned aerial vehicle to be remotely operated.

8. The system of claim 1, further comprising a monitor to document the encounter of the bird and the unmanned aerial vehicle.

9. The system of claim 8, wherein the monitor is on-board the unmanned aerial vehicle.

10. The system of claim 8, wherein the monitor is off-board the unmanned aerial vehicle.

11. The system of claim 8, wherein the monitor is configured to record the encounter of the bird and the unmanned aerial vehicle.

12. The system of claim 1, wherein the appearance of the unmanned aerial vehicle is selected to influence the bird.

13. The system of claim 1, wherein the method of flight of the unmanned aerial vehicle is selected to influence the bird.

14. The system of claim 1, wherein the unmanned aerial vehicle is configured to project a substance toward the bird.

15. The system of claim 14, wherein the substance is an odorant.

16. The system of claim 14, wherein the substance is an aerosol.

17. The system of claim 14, wherein the substance is paint.

18. The system of claim 14, wherein the substance is water.

19. The system of claim 1, wherein the unmanned aerial vehicle further comprises lights.

20. The system of claim 19, wherein the lights are configured to flash.

21. The system of claim 1, wherein the unmanned aerial vehicle further comprises a speaker.

22. The system of claim 21, wherein the speaker is configured to emit audible sounds.

23. The system of claim 21, wherein the speaker is configured to emit audio-modulated ultrasonic sound configured to frequency down-convert in the atmosphere to produce a specified audible sound.

24. The system of claim 1, wherein the gradient field is configured to repel the bird.

25. The system of claim 1, wherein the gradient field is configured to attract the bird.

26. A system for directing a bird away from equipment, comprising:
   a detector configured to detect a bird that could be harmed by or that could harm an item of equipment and to determine the proximity of the bird to the equipment;
   a first unmanned aerial vehicle comprising;
   a second unmanned aerial vehicle comprising;
   a pilot system configured to control the unmanned aerial vehicles; and
   a plurality of emitters configured to generate a gradient field to influence the bird, wherein the plurality of emitters cooperatively generate a first intensity field in an area that the bird is being directed away from and a second intensity field having a lower intensity than the first intensity field where the bird is being directed toward;

wherein the first and second unmanned aerial vehicles cooperate to produce behavior that induces a particular flight path for the bird.

27. The system of claim 26:
wherein at least one of the first and the second the unmanned aerial vehicles is configured to project a substance toward the bird and wherein the substance is at least one of an odorant, an aerosol, a paint, and water.

28. A system for directing a bird away from equipment, comprising:
- a detector configured to detect a bird that could be harmed by or that could harm an item of equipment and to determine the proximity of the bird to the equipment;
- an unmanned aerial vehicle comprising a speaker;
- a pilot system configured to control the unmanned aerial vehicle; and
- an emitter configured to generate a gradient field to influence the bird, wherein the gradient field includes a first intensity field in an area that the bird is being directed away from and a second intensity field where the bird is being directed toward;
- wherein the unmanned aerial vehicle is configured to project a substance toward the bird and wherein the substance is at least one of an odorant, an aerosol, a paint, and water.

29. A system for directing a bird away from equipment, comprising:
- a detector configured to detect a bird that could be harmed by or that could harm an item of equipment and to determine the proximity of the bird to the equipment;
- a first unmanned aerial vehicle lights, wherein the lights are configured to flash;
- a second unmanned aerial vehicle;
- a pilot system configured to control the unmanned aerial vehicles; and
- a plurality of emitters configured to generate a gradient field to influence the bird, wherein the plurality of emitters cooperatively generate a first intensity field in an area that the bird is being directed away from and a second intensity field having a lower intensity than the first intensity field where the bird is being directed toward;
- wherein the unmanned aerial vehicle is configured to project a substance toward the bird and wherein the substance is at least one of an odorant, an aerosol, a paint, and water; and
- wherein the first and second unmanned aerial vehicles cooperate to produce behavior that induces a particular flight path for the bird.

* * * * *